Figure 1:
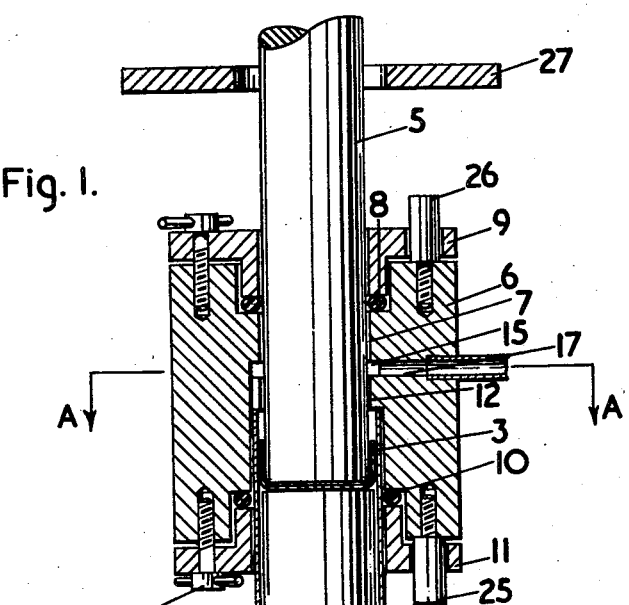

Aug. 1, 1961   G. W. K. FORD ET AL   2,994,423
APPARATUS FOR SHEATHING RODS
Filed March 21, 1950   2 Sheets-Sheet 1

GEORGE WILLIAM KINVIG FORD,
LESLIE MARK WYATT,
OLIVER SIDNEY PLAIL
Inventors

By Robert B Pearson
Attorney

United States Patent Office 2,994,423
Patented Aug. 1, 1961

2,994,423
APPARATUS FOR SHEATHING RODS
George William Kinvig Ford, Leslie Mark Wyatt, and Oliver Sidney Plail, Strand, London, England, assignors, by mesne assignments, to the United States of America as represented by the United States Atomic Energy Commission
Filed Mar. 21, 1950, Ser. No. 150,932
5 Claims. (Cl. 205—4)

This invention relates to the sheathing of nuclear fuel elements such as uranium rods for subsequent use in a nuclear reactor.

The invention has for an object to provide an improved method and improved means for sealing a solid body of nuclear fuel such as a uranium metal rod in a closely-fitting metal container with an internal atmosphere of a chosen gas such as helium. The product is required to operate for long periods at temperatures of several hundred degrees centigrade, to undergo repeated temperature changes, to conduct internally-generated heat readily to its surface and thence to a coolant flowing over it and to retain fission products during its life-time. The container usually needs to be of thin sheet metal to introduce but a small temperature gradient in its thickness, also to introduce small competitive neutron capture. Aluminium is commonly chosen in view of its small thermal-neutron capture-cross-section and its useful mechanical properties. As a result of the heating of the element in operation as nuclear fuel, good heat-conductive contact between the fuel material and the container tends to be lost due to unequal thermal expansion effects; heat conduction then takes place locally at least through a film of whatever gaseous atmosphere exists in the container and via such chance metal-to-metal point contacts as may happen to exist. Since oxygen and nitrogen react with uranium, leaving an attenuated atmosphere of high thermal resistance, an air filling is undesirable and it is desirable to seal the container in a way to ensure an atmosphere of an inert gas of good heat conductivity such as helium.

In the process of the invention in one aspect, a fuel body is temporarily sealed in a container against atmospheric leakage, the container is evacuated and gas under pressure is forced into and entrapped in the container before the final sealing. The entrapping is preferably effected in one end of the container by drawing the container wall down upon the fuel body. Fortuitous cavities between the fuel body and its container may be used to receive the gas but it is preferred to provide a cavity of known size by forming recesses or projections in one or both of the parts or by leaving known clearances.

The invention also resides in a method of sheathing, consisting in subjecting the sheath, loaded with the nuclear fuel body, to the sequential operations of evacuation, gas-filling, drawing (to entrap the gas and to secure close contact between sheath and body) and sealing.

The apparatus for carrying out the method in one form comprises a draw-press having a pumping head arranged to be slidably coupled to an open-mouthed loaded container or sheath during the drawing of the container or sheath. The pumping head may be combined with or fitted on to the ram of a draw-press.

Other features of the invention are set out in the appended claims.

Figure 2:
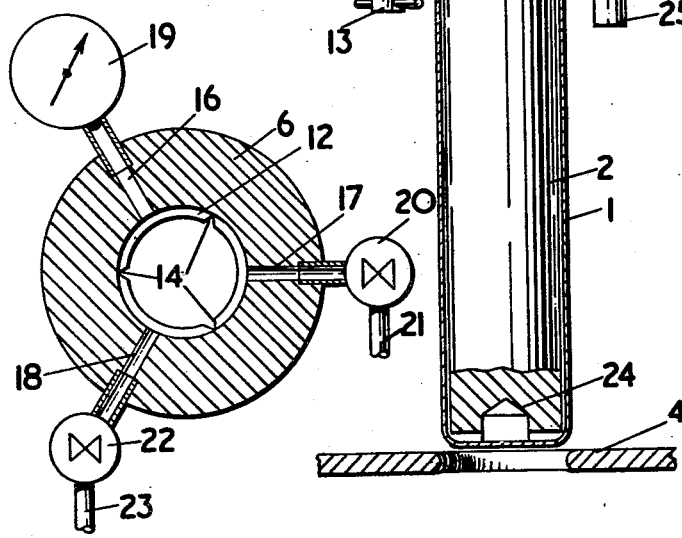
Figure 3:
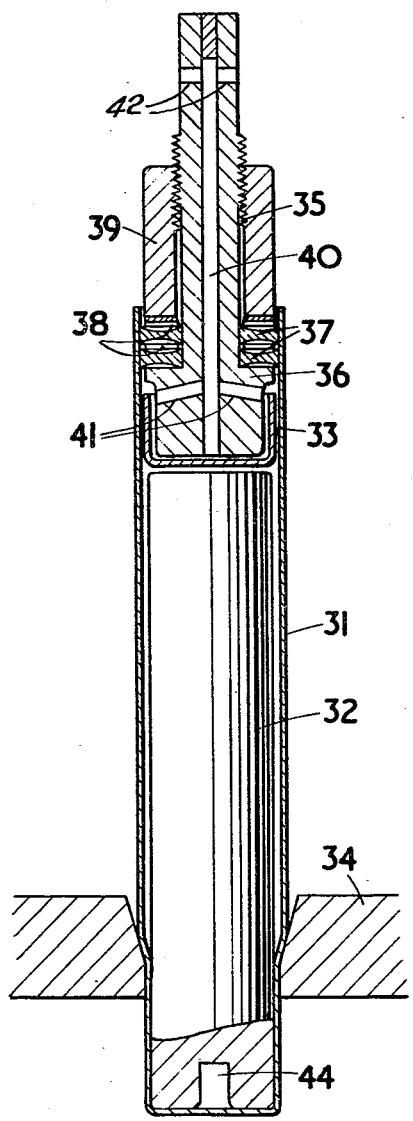

A method of fitting an aluminium sheath upon a uranium rod and charging the sheath with helium in accordance with the invention will now be described by way of example and with reference to the accompanying drawings, in which FIG. 1 is a sectional view of a pumping head associated with a draw-press and carrying a loaded sheath; FIG. 2 is a diagrammatic section at the plane A—A in FIG. 1; and FIG. 3 shows a preferred drawpress, the ram of which serves as a pumping head.

Referring to FIG. 1 a tubular thin-walled aluminium sheath 1 is loaded with a uranium rod 2 and a closure cup 3. It is forced through the fixed die 4 of a drawpress by means of a ram 5 to draw the sheath into close contact with the uranium rod and is subsequently sealed by overturning the open end and brazing or welding the joint, in accordance with known practice.

Before the drawing operation, the sheath is evacuated and gas filled in the following manner, the drawing operation being made use of to trap the gas.

A pumping head in the form of a thick-walled metal sleeve 6 is fitted on the ram 5. The sleeve 6 has a bore 7 which is a running fit on the ram, and a rubber sealing ring 8 compressed by a screw-clamped metal flange 9 to serve as a sliding gland.

A similar rubber sealing ring 10 compressible by a screw-clamped metal flange 11 is provided at the lower end of the head, but the bore is here enlarged to accept the sheath 1. The loaded sheath to be gas-filled and drawn is pushed into the bore up to a shoulder 12, and screws 13, fitted with tommy bars for rapid manipulation, are tightened to compress the sealing ring 10 to seal the sheath in the bore but also to permit sliding of the sheath in the bore. The sealing ring may be lubricated to reduce the friction effect.

The shoulder 12 has axial grooves 14 (FIG. 2) formed in it and above the shoulder is an annular groove 15 from which radiate ducts 16, 17, 18 in which short connecting pipes are fitted. Duct 16 is connected to a miniature vacuum gauge 19 mounted on the head; duct 17 is connected to a vacuum tap 20 from which a flexible pipe 21 extends to an evacuating pump (not shown); duct 18 is connected to a needle valve 22 from which a flexible pipe 23 extends to a helium cylinder (not shown).

With the parts in the position shown the vacuum tap 20 is opened and the sheath evacuated, air being withdrawn from a cavity 24 at the inner end of the uranium rod via the clearance spaces between the rod and the sheath and via the grooves 14 and 15. The tap 20 is then closed and helium is introduced through the needle valve 22 to fill the grooves, the clearance spaces and the cavity 24, to the desired pressure.

The ram is then operated to drive the loaded sheath through the die. As soon as the drawing down begins, the helium gas in the cavity 24 is trapped. The ram drives the loaded sheath through the die and the pumping head moves down with the ram until stop pegs 25, which alternate with clamping screws 13, encounter the die-plate, whereupon the loaded sheath leaves the head and the seal formed by the rubber ring 10 is broken. During the drawing process the sheath tends to elongate; the pumping head is free to slide back on the ram to accommodate such elongation.

The pumping head returns with the ram until pegs 26 upon it encounter a stop 27 which serves to advance it along the ram to an initial position ready for the insertion of another loaded sheath.

The construction of the pumping head and the arrangement of the vacuum gauge, needle valve and vacuum tap upon it are such that the volume of filling gas wasted is small.

In the subsequent operation of sealing the sheaths by brazing or welding already referred to, the remote end of the sheathed rod containing helium in the cavity 24 is immersed in a water tank or otherwise kept cool, to ensure that differential expansion between sheath and uranium does not release the helium.

The preferred shape of the cavity 24 as shown in the drawing is that of a short bore in the end of the uranium rod with a diametric slot across the rod end, ensuring access of the gas to the bore during filling and to the rod periphery during operation of the rod as a fuel element, but other shapes may be adopted.

The arrangement of FIG. 3 differs from that of FIG. 1 mainly in that the ram of a draw-press is itself constructed to serve as a pumping head.

In FIG. 3, an aluminium sheath 31 is shown loaded with a uranium rod 32 and an aluminium closure cup 33, the rod having a gas cavity 44.

The loaded sheath is arranged to be drawn through a die 34 by relative movement of the die and a ram 35.

The ram has a head 36 shaped to fit loosely in the open end of the sheath 31 and the closure cup 33. Rubber sealing rings 37 encircle the ram and can be axially compressed between spacing washers 38 by means of a sleeve 39 screwing on the ram. Compression of the rubber rings causes them to expand radially and to seal the ram to the mouth of the sheath applied over the ram.

The ram has an axial bore 40 communicating with radial passages 41 in its head and with coupling ducts 42 at the remote end of the ram. The coupling ducts 42 lead to a gauge and to evacuating and gas supply lines by way of valves and connecting tubes like those shown in FIG. 2.

The loaded sheath 31 positioned as shown is evacuated and gas filled through the ducts 41, 42 and bore 40 in the ram and is then drawn down on to the rod 32 to contact the rod closely and to entrap the gas, mainly in the cavity 44. During the drawing opertion, elongation of the sheath is taken up by sliding of the sheath over the sealing rings 37. At the end of the draw the loaded sheath is pulled off the ram, the clamping sleeve being preferably unscrewed to facilitate this withdrawal. The sheath is then sealed in conventional manner by cutting, overturning and brazing the mouth of the sheath.

The die is shaped to suit the desired external contour of the sheath. For a sheath with longitudinal fins preformed upon it, a die surface of star or toothed shape may be used.

We claim:

1. An arrangement for sheathing a solid uranium metal rod in a tubular container by working and drawing said tubular container, comprising, a ram, a drawing die, sealing means on the said ram for slidably sealing said ram during the drawing engagement with said die, and ducts in said ram for the passage of gas to and from said ram.

2. An arrangement for sheathing a solid uranium metal rod in a tubular container by working and drawing said tubular container, comprising, a ram, a drawing die, and a pumping head cooperating with and slidable over said ram, said head having ducts in it for the passage of gas to and from said head.

3. An arrangement for sheathing a solid rod in a container with control of the gas composition about the rod, comprising, a ram and a drawing die, operatively associated, a yielding sealing ring encircling said ram, means for radially expanding said sealing ring to engage the mouth of a rod-loaded sheath passed over said ram, and ducts in said ram for the passage of gas to and therefrom.

4. An arrangement for sheathing a solid rod in a container with control of the gas composition about the rod comprising, a draw press, and associated therewith a slidably coupled pumping head.

5. An arrangement for sheathing a nuclear fuel rod in a tubular container by working and drawing said tubular container, comprising, a drawing die, a ram, conduit means for passing gas to and from said container, and sealing means adapted to engage said container to assure the passage of gas to and from said container only through said conduit means.

References Cited in the file of this patent
UNITED STATES PATENTS

| | | |
|---|---|---|
| 1,458,586 | McCrosson | June 12, 1923 |
| 1,771,620 | Ehrmann | July 29, 1930 |
| 1,956,818 | Acre | May 1, 1934 |
| 1,963,745 | Ingersoll et al | June 19, 1934 |
| 2,160,558 | Orr | May 30, 1939 |
| 2,162,063 | Crawford | June 13, 1939 |
| 2,445,152 | Poole | July 13, 1948 |

OTHER REFERENCES

Smyth: "Atomic Energy for Military Purposes," page 103, August 1945.